United States Patent
Zeng et al.

(10) Patent No.: US 12,216,505 B2
(45) Date of Patent: Feb. 4, 2025

(54) EXPANSION DEVICE FOR BUILT-IN HARD DISK

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 91 days.

(21) Appl. No.: 17/881,882

(22) Filed: Aug. 5, 2022

(65) Prior Publication Data

US 2024/0045478 A1 Feb. 8, 2024

(51) Int. Cl.
*G06F 1/16* (2006.01)
*H04N 23/50* (2023.01)

(52) U.S. Cl.
CPC ........... *G06F 1/1658* (2013.01); *H04N 23/50* (2023.01)

(58) Field of Classification Search
CPC .............................. G06F 1/1658; H04N 23/50
See application file for complete search history.

(56) References Cited

U.S. PATENT DOCUMENTS

| | | | | |
|---|---|---|---|---|
| 5,917,545 A | * | 6/1999 | Kowno ................. | H04N 23/50 348/E5.025 |
| 2005/0269769 A1 | * | 12/2005 | Naghi ..................... | A63F 13/24 463/36 |
| 2010/0262776 A1 | * | 10/2010 | Navid .................... | G06F 3/0664 463/44 |
| 2013/0067529 A1 | * | 3/2013 | Chang .................... | H04N 5/781 725/152 |
| 2015/0083619 A1 | * | 3/2015 | Kennard ................ | A45C 11/00 206/320 |
| 2015/0286116 A1 | * | 10/2015 | Johnson, Sr. .......... | F16M 11/28 348/373 |
| 2021/0011359 A1 | * | 1/2021 | Johnson, Sr. .......... | F16M 11/14 |
| 2022/0042647 A1 | * | 2/2022 | Wu ....................... | G03B 17/563 |

FOREIGN PATENT DOCUMENTS

| | | | | |
|---|---|---|---|---|
| CN | 202221604 U | * | 5/2012 | |
| CN | 109008136 A | * | 12/2018 | |
| CN | 208954025 U | * | 6/2019 | |
| CN | 216927350 U | * | 7/2022 | ............. Y02E 60/10 |
| JP | 3113691 U | * | 9/2005 | |
| KR | 20180097016 A | * | 8/2018 | |

\* cited by examiner

*Primary Examiner* — Abhishek M Rathod
*Assistant Examiner* — Keon Kim
(74) *Attorney, Agent, or Firm* — LOZA & LOZA LLP; Derek Yeung

(57) ABSTRACT

The present disclosure relates to the technical field of cameras, and in particular, to an expansion device for a built-in hard disk. The expansion device includes a bottom plate and an expansion assembly, wherein the bottom plate is connected to the expansion assembly, and the bottom plate is provided with a connecting position for connecting to a photographic device; a hard disk mounting plate is provided in the expansion assembly, the hard disk mounting plate is provided with a hard disk interface, the expansion assembly is detachably provided with a hard disk, and the hard disk is connected to the hard disk interface; the hard disk mounting plate is further provided with an external interface. In the expansion device, when the device is used in conjunction with a photographic device, it can be used as a storage capacity expansion structure of the photographic device to provide a larger storage capacity for the photographic device.

11 Claims, 7 Drawing Sheets

EXPANSION DEVICE FOR BUILT-IN HARD DISK

TECHNICAL FIELD

The present disclosure relates to the technical field of cameras, and in particular, to a hard disk expansion device.

INTRODUCTION

At present, in the field of photography, there is a great demand for memory (e.g., hard disk) in a photographic device (e.g., camera), and a simple method for replacing, positioning, and mounting the hard disk or the like. A typical photographic device generally relies on its built-in memory or storage or a memory card installed in a card slot (e.g., an SD card slot). The storage capacity of the device itself is typically small. Further, a large amount of heat can be emitted by the built-in memory of the device during operations that may not dissipate away quickly, which can affect the efficiency of the device.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An object of the present disclosure is to provide an expansion device for an internal storage device (e.g., internal hard disk), and the expansion device can accommodate a built-in large-capacity memory for easy replacement.

In some aspects, an expansion device for a built-in hard disk includes a bottom plate and an expansion assembly, wherein the bottom plate is connected to the expansion assembly, and the bottom plate is provided with a connecting position for connecting to a photographic device; a hard disk mounting plate is provided in the expansion assembly, the hard disk mounting plate is provided with a hard disk interface, the expansion assembly is detachably provided with a hard disk, and the hard disk is connected to the hard disk interface; the hard disk mounting plate is further provided with an external interface for connecting to the photographic device mounted on the connecting position. The bottom plate of the device is connected to the photographic device through the bottom plate to fix the device on the photographic device, and the hard disk interface of the hard disk mounting plate of the device is connected to the hard disk for data transmission. The hard disk mounting plate is further connected to the photographic device through an external interface for data transmission. That is, when the device is used in conjunction with a photographic device, it can be used as a storage capacity expansion structure of the photographic device to provide a larger storage capacity for the photographic device.

Further, one end of the bottom plate is fixed to the expansion assembly, and an upper side of the bottom plate is formed as the connecting position.

Further, the bottom plate is provided with a strip-shaped photographic device mounting slot which penetrates the bottom plate, and the device further includes a mounting screw, one end of the mounting screw is movably connected to the photographic device mounting slot in a back and forth manner. One end of the mounting screw may move back and forth in the mounting slot, so that the position of the mounting screw may be moved to adjust the position of the photographic device mounted on the bottom plate.

Further, the upper side of the bottom plate is provided with a bottom plate rubber pad. The bottom plate rubber pad may be used to protect the photographic device.

Further, the expansion assembly includes a grip, a mounting slot is provided in the grip, a positioning pin is provided in the mounting slot, and the hard disk mounting plate is provided with a positioning hole, the hard disk mounting plate is fixedly provided in the mounting slot, and the positioning hole is sleeved on the positioning pin; an upper end of the hard disk is provided with a data interface, a lower end of the hard disk is provided with a positioning slot adapted to the positioning pin, the data interface at the upper end of the hard disk is detachably plugged into the hard disk interface, and the positioning slot at the lower end of the hard disk abuts against the positioning pin. The arrangement of the positioning pin, the positioning hole and the positioning slot makes the hard disk and the hard disk mounting plate more convenient to mount.

Further, a side edge of the hard disk mounting plate is provided with a data transmission interface, a side of the grip is provided with a data transmission interface through hole penetrating into the mounting slot, the data transmission interface is exposed by the data transmission interface through hole, and a rubber plug for blocking or opening the data transmission interface through hole is hinged at a position of the side of the grip corresponding to the data transmission interface through hole. The arrangement of the data transmission interface enables the data transmission to be performed through a data interface (e.g., USB TYPE-C).

Further, one side of the grip is provided with a first cooling hole penetrating into the mounting slot, and one side of the hard disk mounting plate corresponding to the first cooling hole is provided with a first thermally conductive rubber pad. The arrangement of the first cooling hole and the first thermally conductive rubber pad achieves a good cooling effect of the device.

Further, the other side of the grip is detachably provided with a cooling fin for covering the mounting slot, a protrusion hole is formed between a side edge of the cooling fin and the other side of the grip, and the external interface protrudes out of the grip through the protrusion hole; the cooling fin is provided with a second cooling hole, and one side of the hard disk corresponding to the cooling fin is provided with a second thermally conductive rubber pad. The arrangement of the cooling fin and the second thermally conductive rubber pad further improves the cooling effect of the device.

Further, a side edge of the protrusion hole is detachably provided with an interface fixing member for fixing a position of the external interface, and the interface fixing member abuts against a side surface of the external interface.

Further, one side of the expansion assembly corresponding to the external interface is provided with a fitting surface for adapting to and fitting the photographic device. The arrangement of the fitting surface makes the device and the photographic device more closely connected when they are mounted.

Further, the other side of the expansion assembly is an arc-shaped surface adapted to a palm of a user, and the other side of the expansion assembly is further fixedly provided with a grip rubber pad. The arrangement of the arc-shaped surface and the grip rubber pad makes the device more convenient to hold and use.

Further, the expansion assembly is provided with a wrapping part extending along the side edge corresponding to the external interface, a side surface of the wrapping part is an arc-shaped surface, and the wrapping part is provided with a third cooling hole penetrating the wrapping part. The arrangement of the third cooling hole further improves the cooling effect of the device.

The present disclosure has the advantages that in the present disclosure, the bottom plate of the device is connected to the photographic device through the bottom plate to fix the device on the photographic device, and the hard disk interface of the hard disk mounting plate of the device is connected to the hard disk for data transmission. The hard disk mounting plate is further connected to the photographic device through an external interface for data transmission. That is, when the device is used in conjunction with a photographic device, it can be used as a storage capacity expansion structure of the photographic device to provide a larger storage capacity for the photographic device.

These and other aspects of the disclosure will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. In some practical settings, devices incorporating described aspects and features may also necessarily include additional components and features for implementation and practice of claimed and described examples.

In order to make the object, technical schemes, and advantages of the present disclosure clearer, the present disclosure will be further described in detail with reference to the accompanying drawings and embodiments. It should be understood that the specific embodiments described here are intended for illustrating the present disclosure, but not for limiting the present disclosure.

Figure 1:
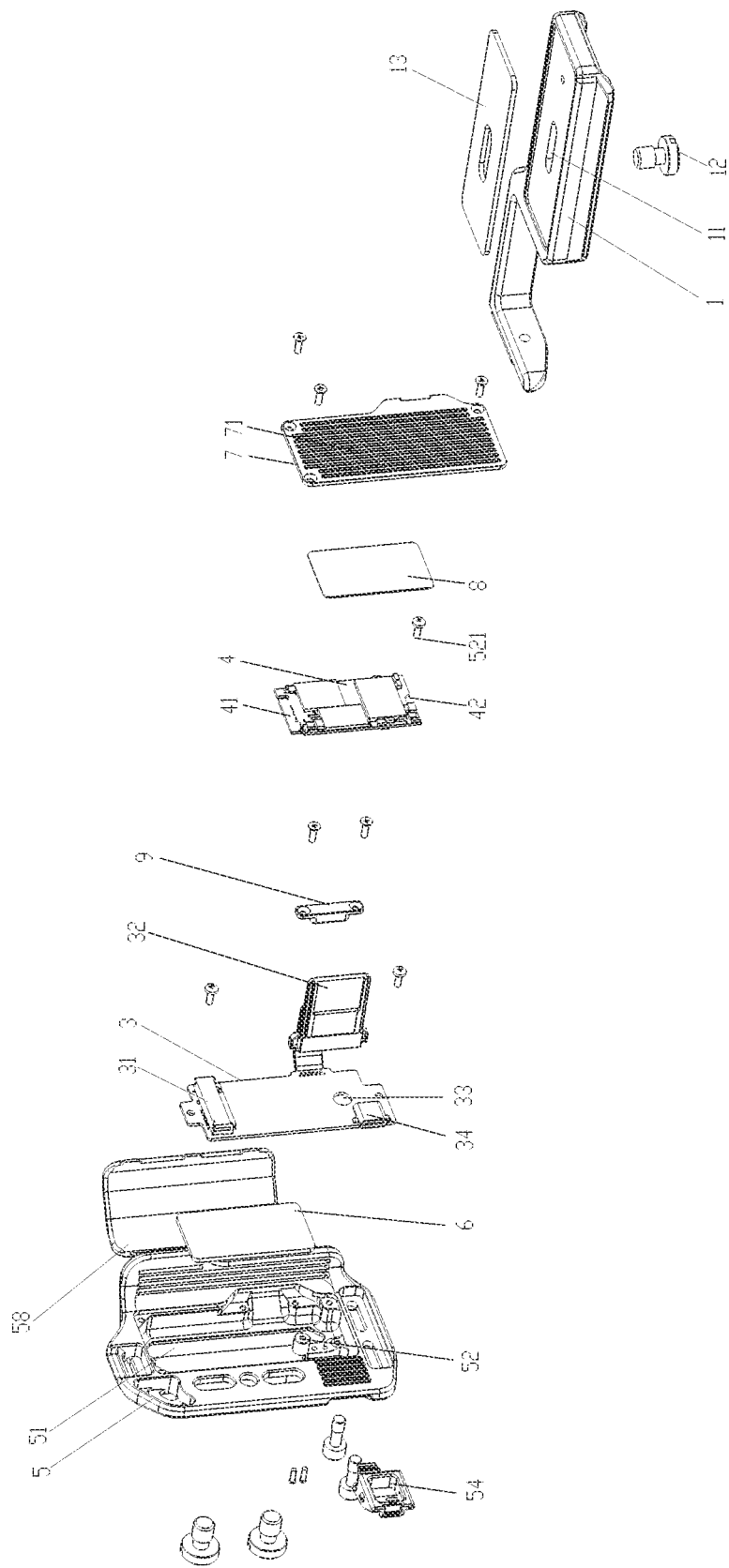
FIG. 1 is a first exploded view of an expansion device according to some aspects of the disclosure.
Figure 2:
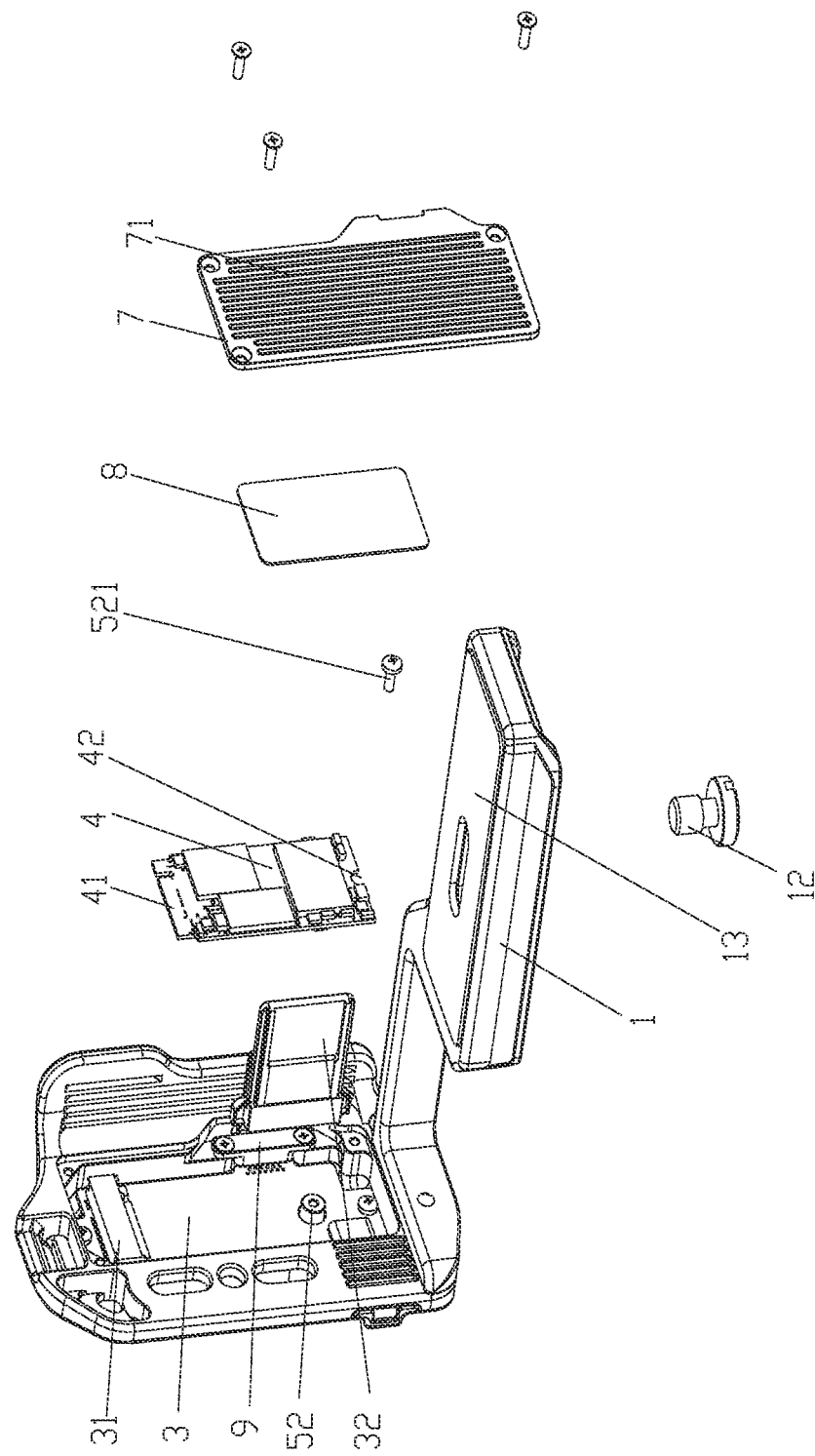
FIG. 2 is a second exploded view of the expansion device according to some aspects of the disclosure.
Figure 3:
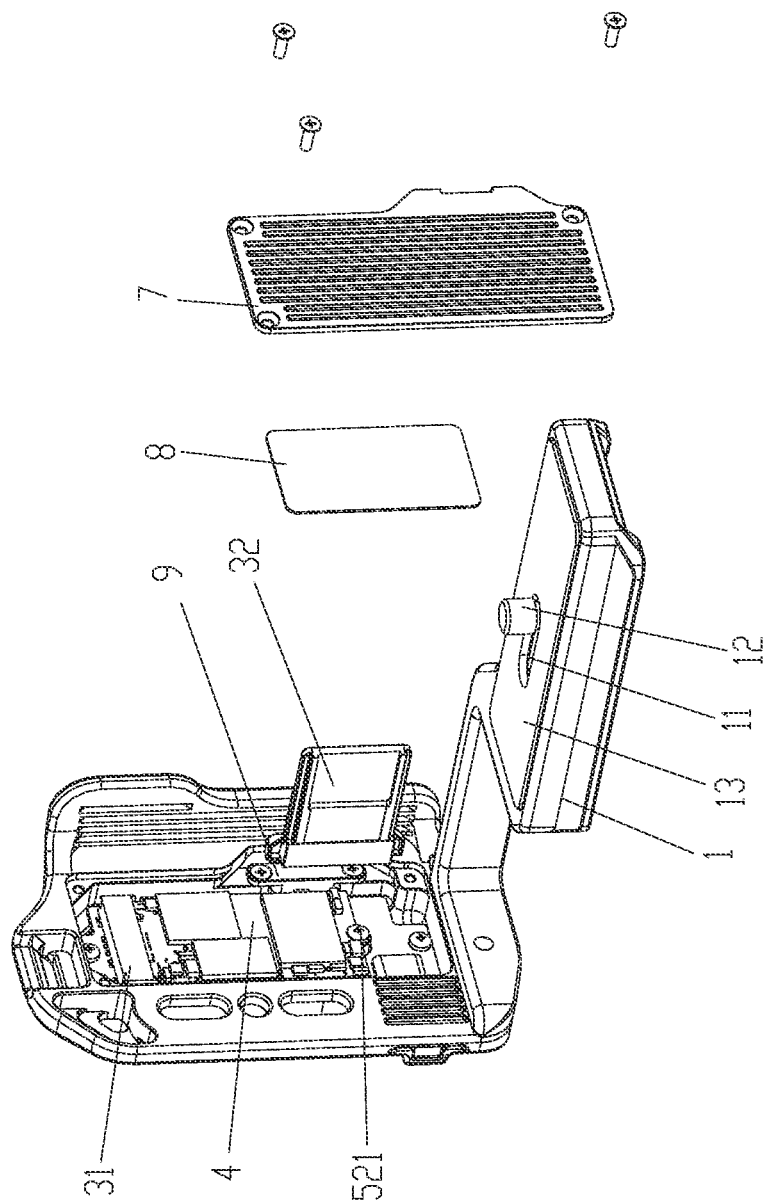
FIG. 3 is a third exploded view of the expansion device according to some aspects of the disclosure.
Figure 4:
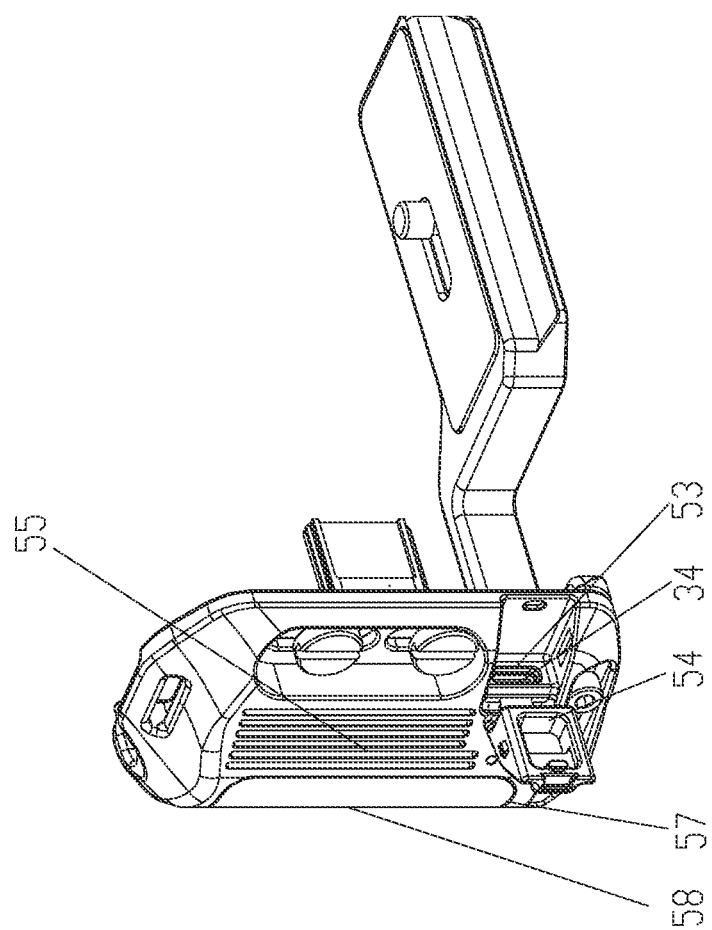
FIG. 4 is a schematic diagram of the expansion device from a first perspective according to some aspects of the disclosure.
Figure 5:
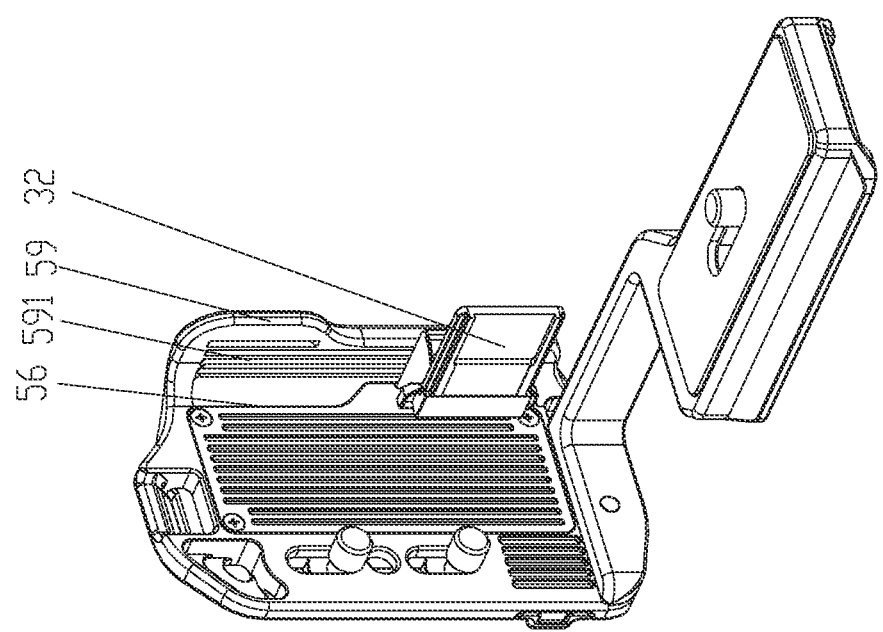
FIG. 5 is a schematic diagram of the expansion device from a second perspective according to some aspects of the disclosure.
Figure 6:
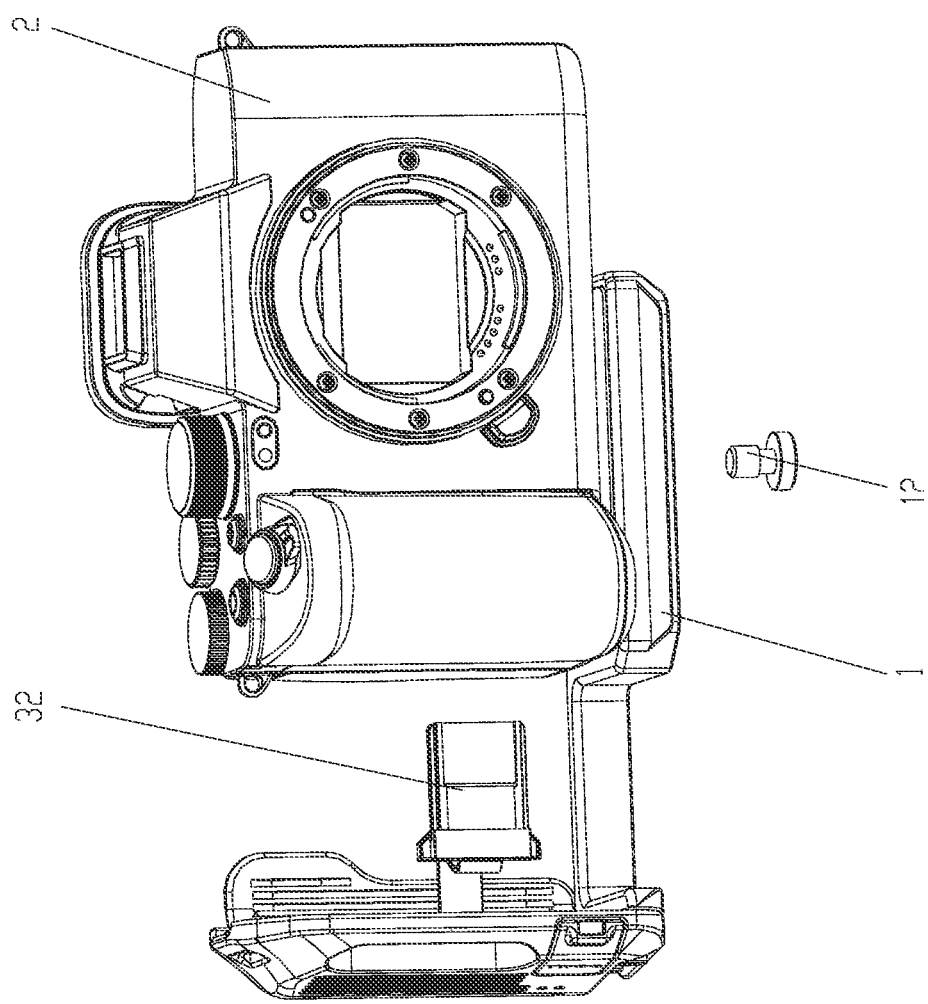
FIG. 6 is an exploded view of the expansion device and a photographic device according to some aspects of the disclosure.
Figure 7:
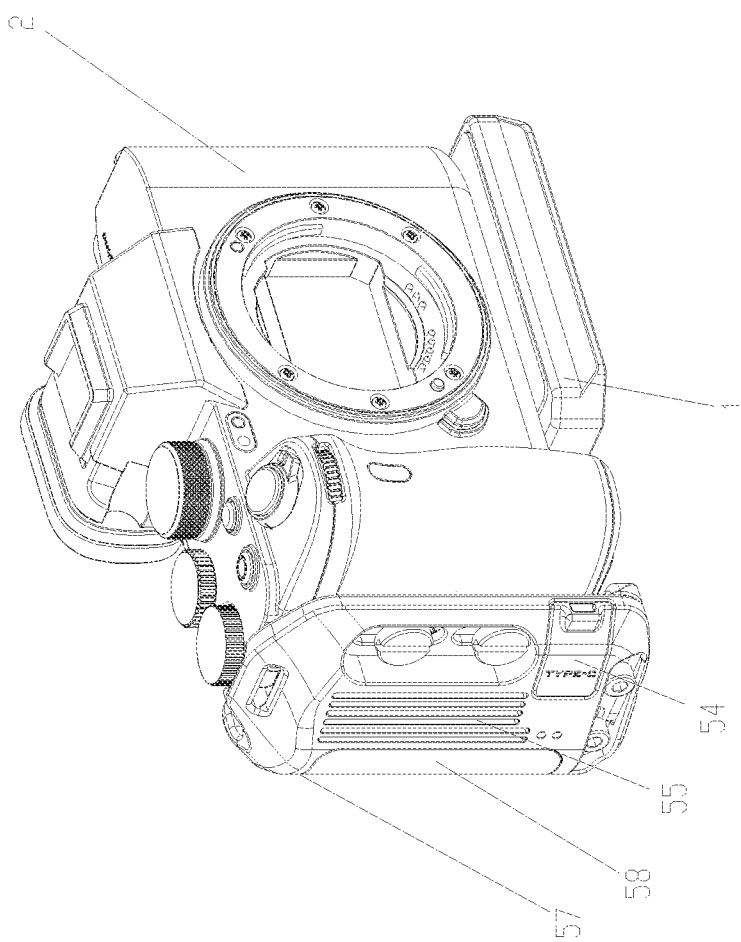
FIG. 7 is a schematic diagram of the expansion device mounted on the photographic device according to some aspects of the disclosure.

Referring to FIGS. 1-7, an expansion device for a built-in hard disk (e.g., a hard disk, hard drive, or SSD drive for internal mounting in a device) includes a bottom plate 1 and an expansion assembly, wherein the bottom plate 1 is connected to the expansion assembly, and the bottom plate 1 is provided with a connecting position for connecting to a photographic device 2 (e.g., see FIG. 6). A hard disk mounting plate 3 is provided in the expansion assembly, and the hard disk mounting plate 3 is provided with a hard disk interface 31. The expansion assembly is detachably provided with a hard disk 4 (or a solid state drive (SSD)), and the hard disk 4 is connected to the hard disk interface 31. The hard disk mounting plate 3 is further provided with an external interface 32 for connecting to another device, for example, the photographic device 2 mounted on the connecting position. For example, the external interface 32 can be adapted to connect to a common Flash memory card connector or slot (e.g., a Secure Digital (SD) card slot or the like) provided in the photographic device 2 (e.g., camera).

In one aspect, one end of the bottom plate 1 is fixed to the extension assembly, and the upper side (upper side in FIG. 1) of the bottom plate 1 is formed as a connecting position.

In one aspect, the bottom plate 1 is provided with a strip-shaped (e.g., elongated) photographic device mounting slot 11 penetrating (e.g., traversing between top and bottom sides) the bottom plate 1. The device further includes a mounting screw 12, one end of the mounting screw 12 is movably connected to the photographic device mounting slot 11 in a back and forth manner (e.g., sliding).

In one aspect, the upper side of the bottom plate 1 is provided with a bottom plate rubber pad 13.

In one aspect, the expansion assembly includes a grip 5, and a mounting slot 51 is provided in the grip 5. A positioning pin 52 is provided in the mounting slot 51. The hard disk mounting plate 3 is provided with a positioning hole 33, the hard disk mounting plate 3 is fixedly provided or mounted in the mounting slot 51. The positioning hole 33 is sleeved on the positioning pin 52 (the positioning pin 52 passes through the positioning hole 33). An upper end (e.g., upper end in FIG. 1) of the hard disk 4 is provided with a data interface 41, and a lower end (e.g., lower end in FIG. 1) of the hard disk 4 is provided with a positioning slot 42 adapted to (e.g., aligned with) the positioning pin 52. The data interface 41 at the upper end of the hard disk 4 is detachably plugged into the hard disk interface 31, and the positioning slot 42 at the lower end of the hard disk 4 abuts against the positioning pin 52. In one example, the positioning pin 52 may be a stud, and may be locked on (e.g., connected to) the hard disk 4 by a locking screw 521 mounted on the stud, where the locking screw 521 abuts against the stud.

In one aspect, a side edge (e.g., vertical sides in FIG. 1) of the hard disk mounting plate 3 is provided with a data transmission interface 34. A side of the grip 5 is provided with a data transmission interface through-hole 53 (e.g., see FIG. 4) penetrating into the mounting slot 51. The data transmission interface 34 is exposed to the outside of the grip 5 by the data transmission interface through-hole 53. A rubber plug 54 for blocking (e.g., covering) or opening the data transmission interface through-hole is movably (e.g., hinged) mounted at a position at the side of the grip 5 corresponding to the data transmission interface through-hole 53.

In one aspect, one side of the grip 5 is provided with a first cooling hole 55 (see FIG. 5) penetrating into the mounting slot. One side of the hard disk mounting plate 3 corresponding to the first cooling hole 55 is provided with a first thermally conductive rubber pad 6.

In one aspect, the other side of the grip 5 is detachably provided with a cooling fin 7 (e.g., a cooling plate with openings) for covering the mounting slot. A protrusion hole (e.g., a cutout on an extended portion of the cooling fin 7) is formed between a side edge of the cooling fin 7 and the other side of the grip 5. The external interface 32 protrudes out of the grip 5 through the protrusion hole or cutout. The cooling fin 7 is provided with a second cooling hole 71 (e.g., cooling vents), and one side of the hard disk 4 corresponding to the cooling fin 7 is provided with a second thermally conductive rubber pad 8.

In one aspect, a side edge of the protrusion hole is detachably provided with an interface fixing member 9 (e.g., a bracket) for fixing a position of the external interface 32, and the interface fixing member 9 abuts against a side surface of the external interface 32.

In one aspect, one side of the expansion assembly corresponding to the external interface 32 is provided with a fitting surface 56 (e.g., see FIG. 5) for adapting to and fitting the photographic device when the expansion assembly is mounted on the photographic device.

In one aspect, the other side of the expansion assembly is an arc-shaped surface 57 (e.g., see FIG. 7) adapted to a palm of a user, and the other side of the expansion assembly can be further fixedly provided with a grip rubber pad 58.

In one aspect, the expansion assembly is provided with a wrapping part 59 extending along the side edge corresponding to the external interface 32, a side surface of the wrapping part 59 has an arc-shaped surface. The wrapping part 59 is provided with a third cooling hole 591 (e.g., see FIG. 5) penetrating (e.g., between opposite surfaces) the wrapping part 59.

The above are only examples of the present disclosure, and are not intended to limit the present disclosure. Any modifications, equivalent replacements and improvements made within the spirit and principle of the present disclosure shall fall within the scope of protection of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An expansion device for a built-in hard disk, comprising:
- a bottom plate, wherein the bottom plate is provided with a connecting position and a mounting screw for connecting the bottom plate to a photographic device using the mounting screw;
- a grip, a mounting slot is provided in the grip, a positioning pin is provided in the mounting slot; and
- an expansion assembly connected to the bottom plate, the expansion assembly and the mounting screw extending from the bottom plate toward a same direction,
- wherein the bottom plate is connected to a bottom side of the expansion assembly,
- wherein the expansion assembly comprises a hard disk mounting plate,
- wherein the hard disk mounting plate comprises a hard disk interface, and an external interface for connecting to the photographic device mounted on the connecting position, the external interface adapted to connect to a memory card slot of the photographic device,
- wherein the expansion assembly is configured to detachably receive a hard disk in the expansion assembly, and the hard disk is connected to the hard disk interface,
- wherein one side of the grip is provided with a first cooling hole penetrating into the mounting slot, and one side of the hard disk mounting plate corresponding to the first cooling hole is provided with a first thermally conductive rubber pad,
- wherein the other side of the grip is detachably provided with a cooling fin for covering the mounting slot, a protrusion hole is formed between a side edge of the cooling fin and the other side of the grip, and the external interface protrudes out of the grip through the protrusion hole, and
- wherein the cooling fin is provided with a second cooling hole, and one side of the hard disk corresponding to the cooling fin is provided with a second thermally conductive rubber pad.

2. The expansion device according to claim 1, wherein one end of the bottom plate is fixed to the expansion assembly, and an upper side of the bottom plate forms the connecting position.

3. The expansion device according to claim 1, wherein the expansion assembly comprises:
- the hard disk mounting plate is provided with a positioning hole, the hard disk mounting plate is fixedly provided in the mounting slot, and the positioning hole is sleeved on the positioning pin; and
- an upper end of the hard disk is provided with a data interface, a lower end of the hard disk is provided with a positioning slot adapted to the positioning pin, the data interface at the upper end of the hard disk is detachably plugged into the hard disk interface, and the positioning slot at the lower end of the hard disk abuts against the positioning pin.

4. The expansion device according to claim 3, wherein a side edge of the hard disk mounting plate is provided with a data transmission interface, a side of the grip is provided with a data transmission interface through hole penetrating into the mounting slot, the data transmission interface is exposed by the data transmission interface through hole, and a rubber plug for covering or opening the data transmission interface through hole is hinged at a position of the side of the grip corresponding to the data transmission interface through hole.

5. The expansion device according to claim 1, wherein a side edge of the protrusion hole is detachably provided with an interface fixing member for fixing a position of the external interface, and the interface fixing member abuts against a side surface of the external interface.

6. The expansion device according to claim 1, wherein one side of the expansion assembly corresponding to the external interface is provided with a fitting surface for adapting to and fitting a shape of the photographic device.

7. The expansion device according to claim 6, wherein the other side of the expansion assembly has an arc-shaped surface adapted to a palm of a user, and the other side of the expansion assembly is further fixedly provided with a grip rubber pad.

8. The expansion device according to claim 7, wherein the expansion assembly is provided with a wrapping part extending along a side edge corresponding to the external interface, a side surface of the wrapping part has an arc-shaped surface, and the wrapping part is provided with a third cooling hole penetrating the wrapping part.

9. The expansive device according to claim 1, wherein memory card slot comprises a Flash memory card slot.

10. The expansive device according to claim 1, wherein the external interface and the mounting screw respectively extend toward different directions.

11. An expansion device for a built-in hard disk, comprising:
- a bottom plate, wherein the bottom plate is provided with a connecting position and a mounting screw for connecting the bottom plate to a photographic device using the mounting screw; and
- an expansion assembly connected to the bottom plate, the expansion assembly and the mounting screw extending from the bottom plate toward a same direction,
- wherein the bottom plate is connected to a bottom side of the expansion assembly,
- wherein the expansion assembly comprises a hard disk mounting plate,
- wherein the hard disk mounting plate comprises a hard disk interface, and an external interface for connecting to the photographic device mounted on the connecting position, the external interface adapted to connect to a memory card slot of the photographic device,
- wherein the expansion assembly is configured to detachably receive a hard disk in the expansion assembly, and the hard disk is connected to the hard disk interface, and
- wherein the expansion assembly comprises a grip and a cooling fin, wherein the external interface protrudes out of the grip through a hole formed between a side edge of the cooling fin and a side of the grip.

* * * * *